United States Patent
Niem et al.

(10) Patent No.: US 9,576,335 B2
(45) Date of Patent: Feb. 21, 2017

(54) METHOD, DEVICE, AND COMPUTER PROGRAM FOR REDUCING THE RESOLUTION OF AN INPUT IMAGE

(75) Inventors: Wolfgang Niem, Hildesheim (DE); Bernd Anhaeupl, Erlangen (DE)

(73) Assignee: Robert Bosch GmbH, Stuttgart (DE)

( * ) Notice: Subject to any disclaimer, the term of this patent is extended or adjusted under 35 U.S.C. 154(b) by 1086 days.

(21) Appl. No.: 12/418,706

(22) Filed: Apr. 6, 2009
(Under 37 CFR 1.47)

(65) Prior Publication Data

US 2010/0002074 A1    Jan. 7, 2010

(30) Foreign Application Priority Data

Apr. 9, 2008 (DE) .......................... 10 2008 001 076

(51) Int. Cl.
*H04N 13/00* (2006.01)
*G06T 3/00* (2006.01)

(52) U.S. Cl.
CPC .............. *G06T 3/0012* (2013.01); *G06T 3/00* (2013.01)

(58) Field of Classification Search
CPC .................................. G06T 3/0012; G06T 3/00
USPC .... 348/42, 43, 46–49, 211.9, 345, 348, 143, 348/147, 384.1, 390.1, 333.12, 387.1; 345/698, 699, 428
See application file for complete search history.

(56) References Cited

U.S. PATENT DOCUMENTS

| | | | | |
|---|---|---|---|---|
| 6,975,352 | B2* | 12/2005 | Seeger et al. .............. | 348/218.1 |
| 7,385,743 | B2* | 6/2008 | Gagliano et al. .......... | 359/196.1 |
| 7,453,614 | B2* | 11/2008 | Gagliano et al. .......... | 359/196.1 |
| 7,627,199 | B2* | 12/2009 | Sato et al. .................. | 382/305 |
| 7,855,752 | B2* | 12/2010 | Baker et al. ................ | 348/588 |
| 2002/0075389 | A1* | 6/2002 | Seeger et al. ............... | 348/222 |
| 2005/0036185 | A1* | 2/2005 | Gagliano et al. ............ | 359/196 |
| 2007/0248244 | A1* | 10/2007 | Sato et al. ................... | 382/103 |
| 2007/0268530 | A1* | 11/2007 | Gagliano et al. ............ | 358/496 |
| 2008/0024390 | A1* | 1/2008 | Baker et al. ................. | 345/1.3 |
| 2010/0034520 | A1* | 2/2010 | Chung ......................... | 386/109 |
| 2010/0067738 | A1* | 3/2010 | Petricoin, Jr. ............... | 382/103 |

FOREIGN PATENT DOCUMENTS

| | | |
|---|---|---|
| EP | 0 710 927 | 5/1996 |
| EP | 1 427 212 | 6/2004 |
| JP | 2000-278683 | 10/2000 |
| JP | 2006-261871 | 9/2006 |

OTHER PUBLICATIONS

IVMD 1.0 Intelligent Video Motion Detection, Bosch Security System, Configuration Instructions, Apr. 2006, pp. 1-41.
Ingo Bauermann et al : "H.264 Based Coding of Omnidirectional Video" International Conference on Computer Vision and Graphics ICCVG 2004, Sep. 2004, Warsaw.

* cited by examiner

*Primary Examiner* — Kenneth R Coulter
(74) *Attorney, Agent, or Firm* — Michael J. Striker

(57) ABSTRACT

In a method, a device, and a computer program for reducing the resolution of an input image, wherein input image shows a three-dimensional scene that was recorded by a surveillance camera, the distance between surveillance camera and objects in the three-dimensional scene is referred to as the object distance, and the resolution reduction is adjusted with consideration for the object distance in the three-dimensional scene and/or the perspective distortion of the three-dimensional scene.

16 Claims, 1 Drawing Sheet

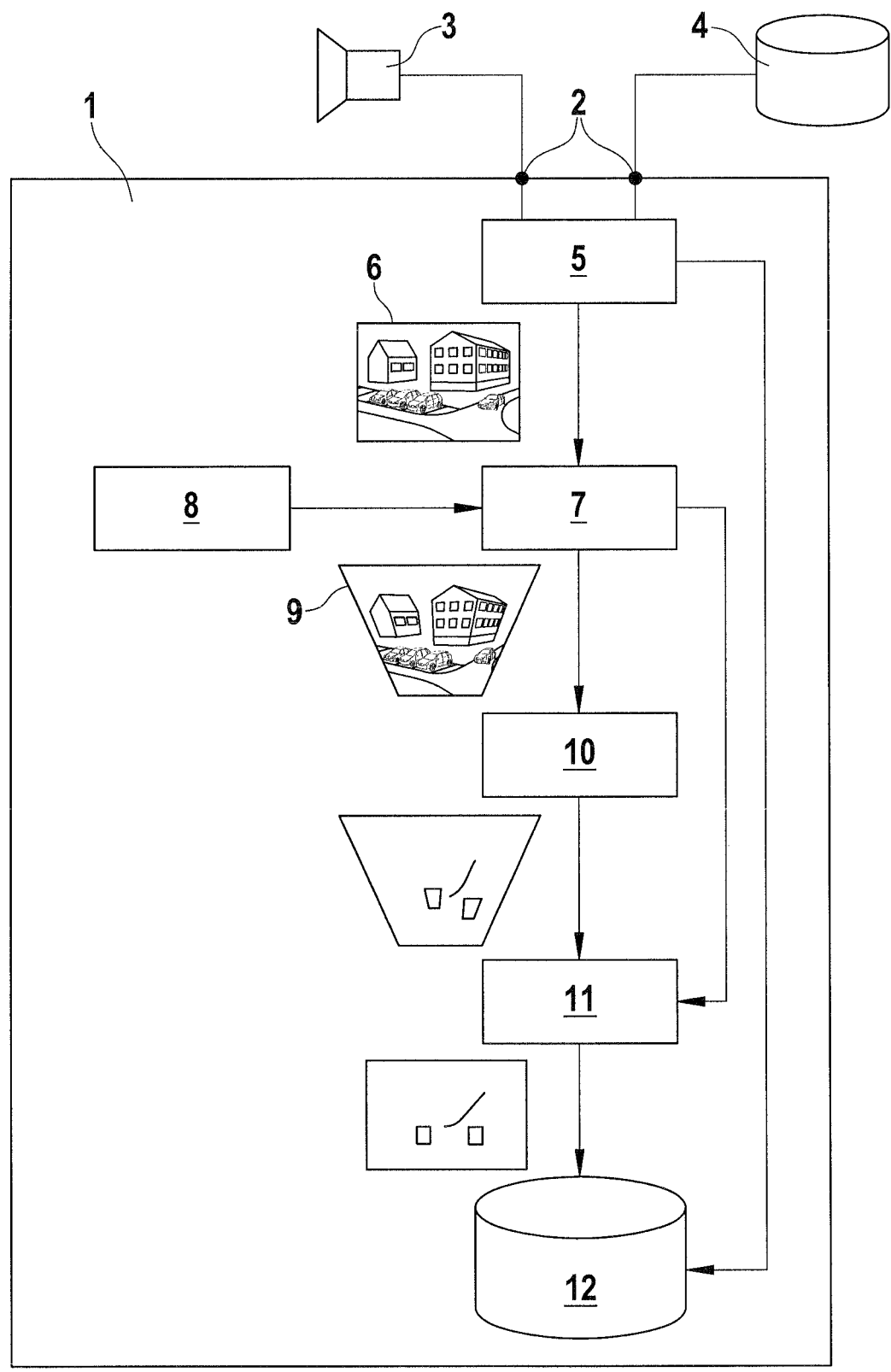

METHOD, DEVICE, AND COMPUTER PROGRAM FOR REDUCING THE RESOLUTION OF AN INPUT IMAGE

CROSS-REFERENCE TO RELATED APPLICATION

The invention described and claimed hereinbelow is also described in German Patent Application DE 10 2008 001 076.6 filed on Apr. 9, 2008. This German Patent Application, whose subject matter is incorporated here by reference, provides the basis for a claim of priority of invention under 35 U.S.C. 119(a)-(d).

BACKGROUND OF THE INVENTION

The present invention relates to a method for reducing the resolution of an input image, wherein the input image shows a three-dimensional scene that was recorded by a surveillance camera, and wherein the distance between the surveillance camera and the objects in the three-dimensional scene is referred to as the object distance; the present invention also relates to a related device and a computer program for carrying out the method. Methods for reducing resolution without accounting for the object distance are known from the literature.

Video surveillance systems are used to monitor public spaces, such as train stations, market places, street intersections, or the like, and public buildings, such as libraries, agencies, courtrooms, prisons, etc. Video surveillance systems are also used in the private sector, e.g. as alarm systems or for watching over individuals who require attention.

Video surveillance systems usually include a plurality of permanently installed cameras which observe the relevant areas in the surroundings, and they include a possibility for evaluating the video sequences that were recorded using the cameras. While the evaluation was previously carried out by monitoring personnel, automatic evaluation of the video sequences has become more common.

In a typical application of automatic monitoring, in a first step, moving objects are separated from the essentially stationary background in the scene (object segmentation), they are tracked over time (object tracking), and, if relevant movement or patterns of movement take place, an alarm is triggered. One possible design of automatic monitoring of this type is described, e.g., in EP 0710927 B1 which discusses a method for the object-oriented detection of moving objects.

It also appears to be commonly known to approximately determine object properties such as size or speed based on estimated object positions in 3-dimensional space, or based on variables related thereto, using an assumed base plane in the scene (see, e.g. the operating instructions "IVMD 1.0 Intelligent Video Motion Detection, Configuration Instructions" for Bosch IVMD Software). It is also known to automatically control the zoom function/focal length of a PTZ camera (pan-tilt-zoom camera) based on an estimated object distance or the angle of inclination of the camera with the goal of depicting a tracked object independently of a changing position in such a manner that the tracked object is the same size in every image in the video sequence (Bosch AutoDome cameras with AutoTrack function, see EP1427212A1).

Despite the continuous increase in processor performance, it is still a challenge to process video sequences in real time, that is, to perform object segmentation and object tracking in real time. To reduce the processor load, it is common for the resolution of video sequences to be reduced equally in the horizontal and/or vertical directions before the images are processed via down-sampling. In this manner, the amount of computing effort required for every individual image in the video sequence, and therefore, for the entire video sequence, is minimized or at least reduced.

Moreover, it is known from the field of videocoding, e.g. as described in the conference presentation "Ingo Bauermann, Matthias Mielke and Eckehard Steinbach: H.264 based coding of omnidirectional video; International Conference on Computer Vision and Graphics ICCVG 2004, September 2004, Warsaw" that a rectification, e.g. in the case of 360° panoramic cameras and fisheye lenses, of perspective distortions that occur may have an advantageous effect on the subsequent image-processing procedure.

Methods for the targeted rectification or distortion of images or image sequences have furthermore been known for a long time, e.g. from the field of analog and digital photography (rectification of aerial photographs, compensation of converging verticals) and computer graphics (warping and morphing methods).

The prior art also makes known methods for camera calibration, with which important camera characteristic values such as lens properties, and the position and/or orientation relative to objects may be derived automatically based on suitable image sequences.

SUMMARY OF THE INVENTION

The present invention provides a method for reducing the resolution of an input image, a device for reducing the resolution of an input image, and a corresponding computer program.

Within the scope of the present invention, a method for reducing the resolution of an input image is presented, wherein the input image may be, e.g. part of a video sequence, and it may be presented in any format, i.e. in particular black/white or color.

The input image shows a three-dimensional scene that was recorded using a surveillance camera, wherein the scene, as explained in the introduction, may be, e.g. a plaza, a room, or the like. The surveillance camera may have any type of design, and it may therefore be designed, in particular, as a black/white or color camera having a normal lens, a fisheye lens, or a 360° panoramic lens; it may be rigidly or immovably installed, or it may be designed as a movable surveillance camera, in particular a PTZ camera (pan-tilt-zoom camera).

The resolution is preferably reduced by reducing the number of image points or pixels that carry the input-image information. The number of image points is preferably reduced by down-sampling the input image or a further-processed image that is based on the input image. As a possible alternative to down-sampling, it is also possible, in particular, to combine adjacent image points or pixels to form one common image point or pixel, e.g. via averaging.

The input image may be—but does not have to be—provided directly from the surveillance camera; it is also possible to first store the input image for an interim in a storage medium or a recorder. In particular, the input image may be transmitted for processing via cable and/or wirelessly, e.g. via a network, in particular the Internet.

For purposes of definition, the object distance is the distance between objects in a three-dimensional scene and the surveillance camera, in particular the object-side, optical principal plane of the surveillance camera, or, in the case of input images which have already been perspectively rectified and/or pre-processed, from a related virtual surveillance camera, wherein the conventional nomenclature used in technical optics is preferably used.

According to the present invention, it is provided that the resolution reduction is adjusted with consideration for the object distance in the three-dimensional scene, and/or the perspective distortion of the three-dimensional scene.

The resolution reduction via the input image therefore no longer takes place evenly—as is known from the prior art—but in a varying manner that is dependent on location, in particular in a manner such that regions or image regions having a greater resolution reduction are obtained, and regions or image regions having a lesser resolution reduction are obtained.

The present invention is based on the known fact that, due to the perspective depiction or distortion by the surveillance camera, remote objects are depicted smaller in size than are close objects, even when the objects are actually of the same size. If down-sampling—as is common in the prior art—is now applied evenly across the input image, remote objects, e.g. objects that are located close to the horizon, are depicted after the down-sampling using very few image points. Since remote objects are hereby disadvantaged relative to close objects, remote objects are detected poorly in the subsequent object segmentation and/or detection.

The present invention is therefore based on the idea of reducing the resolution of the input image in such a manner that the regions in the input image that represent a large object distance and are therefore shown reduced in size have their resolution reduced to a lesser extent than do the image regions located close to the surveillance camera, therefore represent a small object distance, and are depicted less small in size. A predefined minimum resolution reduction or even no change in resolution is applied to image regions to which an actual object distance is unassignable, e.g. the sky over the horizon, or to regions for which this would not result in a sufficient resolution reduction or would even result in an increase in resolution, wherein the transition to these regions may take place abruptly or gradually. In this manner, objects that are of equal size, but that are close or remote are depicted using a similar number of image points, or at least using a number of image points that is less different as compared to the prior art, thereby markedly increasing the overall detection performance of the method according to the present invention, in particular for objects that are located further away.

In a particular local approach to the solution, resolution is reduced with consideration for the object distance of objects in the three-dimensional scene. In a particular global approach to the solution, resolution is reduced with consideration for the perspective distortion or depiction of the three-dimensional scene. Both approaches are based on the same inventive idea, however, namely that of adjusting the resolution reduction as a function of the distance of objects in the scene and of detection objects.

In a practical realization of the method, resolution is reduced in such a manner that the resolution of regions in the input image that represent regions in the three-dimensional scene having great object distance is reduced to a lesser extent than that of regions in the input image that represent regions in the three-dimensional scene having a small object distance. In the simplest case, in regions in which the minimum resolution reduction will not be applied, the two-dimensional areal change in resolution may take place in proportion to the square of the object distance, or it may be determined globally based on the object distance using another, monotonously increasing characteristic curve that is limited at the top by the minimum resolution reduction, wherein, for regions to which a finite object distance is unassignable, resolution is reduced in accordance with the limiting value for infinite object distances. As an alternative, for regions that are associated with no object distance, or that are associated with a real object distance that is too great according to the desired minimum resolution reduction, it is possible instead to directly apply a maximum object distance that corresponds to the minimum resolution reduction.

The change in resolution itself may be carried out specially using the representation specification $$\tilde{x}=w_x(x,y)$$

$$\tilde{y}=w_x(x,y)$$

using known methods from the field of computer graphics (morphing/warping methods). The variables x and y represent Cartesian coordinates of the distortion-free image, and the variables $\tilde{x}$ and $\tilde{y}$ represent Cartesian coordinates of the resolution-reduced image.

The functions $w_x(x, y)$ and $w_y(x, y)$ required for this purpose may be determined, e.g. as follows, based on the required location-dependent, two-dimensional change in resolution $a(x,y)$:

First, the function $a(x,y)$ is resolved into the product of two positive subfactors, as follows:

$$a(x,y)=a_x(x,y) \cdot a_y(x,y)$$

Special cases contained therein are, in particular, the two 1-dimensional, location-dependent resolution reductions $$a_x(x,y)\equiv a_{0x}, \; a_y(x,y):=a(x,y)/a_{0x} \text{ and } a_x(x,y):=a(x,y)/a_{0y}, \; a_y(x,y)\equiv a_{0y}, \text{ and}$$

the uniform, 2-dimensional, location-dependent change in resolution described by $a_x(x,y):=\sqrt{a(x,y)} \cdot a_{xy}$, $a_y(x,y):=\sqrt{a(x,y)}/a_{xy}$, having constants $a_{0x}$, $a_{0y}$, and $a_{xy}$ that may be chosen accordingly; in the simplest case $a_{0x}=1$, $a_{0y}=1$ and $a_{xy}=1$.

Based hereon, and using an appropriately freely selectable function $\tilde{x}_0(y)$ which in the simplest case is $\tilde{x}_0(y)\equiv 0$, the function $w_x(x,y)$ is determined, as follows:

$$w_x(x, y) := \tilde{x}_0(y) + \int_0^x a_x(x', y) dx'$$

thereby transforming the function $a_y(\tilde{x},y)$ into the corresponding function $\tilde{a}_x(\tilde{x},y)$ in the $(\tilde{x},y)$ coordinate system using the implicit condition $$\tilde{a}_y(w_x(x, y), y) \stackrel{!}{=} a_y(x, y)$$

The function $w_y(x,y)$ is then obtained by using a further appropriately freely selectable function $\tilde{y}_0(x)$ which, in the simplest case is $\tilde{y}_0(x)\equiv 0$, and the auxiliary function $$\tilde{w}_y(\tilde{x}, y) := \tilde{y}_0(y) + \int_0^y \tilde{a}_y(\tilde{x}, y') dy'$$

to obtain $$w_y(x,y):=\tilde{w}_y(w_x(x,y),y).$$

In the technical realization, the equations and their correspondences presented above must be solved—in other coordinate systems that are preferably adapted to the design of the recording sensor and the distortion-free images that have been resolution-reduced in a location-dependent manner according to the present invention, provided, in particular, that the calculation has not taken place in advance outside of the device according to the present invention, in the case, in particular, of the development described below—using known approximation methods in numerical mathematics, e.g. using digital computers contained in the device, in so far as the results, e.g. in the form of look-up tables for discrete support points for the functions presented above, are required for the morphing/warping methods described initially. The location-dependent resolution reduction may take place in one overall step, or as a chain of several sub-steps, e.g. using an intermediate image in the (coordinate system described above.

In a preferred embodiment, the resolution reduction of the input image is adapted via the modeling of a scene reference model. The scene reference model includes regions to each of which object distances are assigned. For example, the three-dimensional scene may show an escalator in one region, to which a first object distance or a first object distance range is assigned, and, next to the escalator, it may show a large interior space that extends far into the distance, to which a second object distance or a second object distance range is assigned. In a development of the method, sub-images that are resolution-reduced in a location-dependent manner according to the present invention are generated separately in particular for regions having object distances that differ greatly from one another, wherein these sub-images preferably overlap to the extent that objects in the scene may extend from one region into an adjacent region having a vastly different object distance, as in the example described above of persons on an escalator.

In another alternative embodiment, the resolution reduction is adapted using the modeling of a base plane, which known per se, in particular a flat base plane, in particular by adapting the resolution reduction only in accordance with the perspective distortion of the base plane.

The location-dependent resolution reduction is therefore carried out once more, as described above, based on the virtual object distance, as it is specified here by the position and shape of the base plane.

The resolution reduction according to the present invention takes place in a particularly simple manner preferably in the case of a flat base plane. Intellectually speaking—for the technical realization, it is possible, of course, for the equations presented below to be transformed into another coordinate system that preferably corresponds to the design and orientation of the recording sensor and the distortion-free images—if one chooses the (x,y) coordinate system for the distortion-free image such that its y-axis extends "upward" and is perpendicular to the horizon defined by the base plane, then the object distance g(x,y) below the horizon may be calculated as follows:

$$g(x, y) = \frac{g_0}{1 - y/y_\infty}$$

with the given parameters $g_0$ and $y_\infty$ as defined by the position of the base plane relative to the camera, based on which suitable functions $w_x(x, y)$ and $w_y(x, y)$ may be determined in an obvious manner as described above.

A preferred embodiment is obtained in particular as follows:

$$a_x(x, y) := \begin{cases} \hat{a}_{0x}\left(\frac{y_\infty - y_1}{y_\infty - y}\right)^{\lambda_x}, & y < y_1 \\ \hat{a}_{0x}, & y \geq y_1 \end{cases}$$

$$a_y(x, y) := \begin{cases} \hat{a}_{0y}\left(\frac{y_\infty - y_1}{y_\infty - y}\right)^{\lambda_y}, & y < y_1 \\ \hat{a}_{0y}, & y \geq y_1 \end{cases}$$

with parameters $\lambda_x, \lambda_y \geq 0$ which are selected in a suitable manner. In this case, $\hat{a}_{0x}$ and $\hat{a}_{0y}$ represent the linear minimum resolution reductions in the x and y directions above a line that is parallel to the horizon, having the y-coordinate $y_1 < y_\infty$.

Particularly advantageous variants result for the case in which $\lambda_x + \lambda_y = 2$, since, in this case, the two-dimensional change in resolution is exactly proportional to the square of the object distance.

In the special variant $\lambda_x = \lambda_y = 1$, it is particularly advantageous that the location-dependent resolution reduction also affects both coordinate directions to the same extent, thereby making it possible to better utilize the sensor resolution for remote objects.

In terms of the two special variants $\lambda_x = 2$, $\lambda_y = 0$, and $\lambda_x = 0$, $\lambda_y = 2$, it is also particularly advantageous that only one 1-dimensional, location-dependent resolution reduction is carried out, which may be realized with less effort and, particularly in the second case, given a suitable camera orientation, it is possible to generate a rectangular image that has been resolution-reduced in the manner according to the present invention starting with a rectangular original image.

Further embodiments according to the present invention result when the expressions for the two sub-regions are taken into account in the relationships described above in the range $y < y_1$ using a suitable, variable, y-dependent weighting, thereby replacing the abrupt transition between the two ranges $y < y_1$ and $y \geq y_1$ with a gradual transition.

Further embodiments according to the present invention result—in the determination described above of sub-images that are resolution-reduced separately using a scene reference model by performing the location-dependent resolution reduction according to the present invention for individual sub-images or all sub-images based not on the scene reference model itself, but instead on the perspective distortion of corresponding, region-specific base planes. In that example, a different base plane would be used for the escalator region than for the rest of the interior space.

Further advantageous embodiments according to the present invention result from the combination of a reasonable pre-rectification of camera images, the combination being based in particular on special camera properties (e.g. for fisheye objects) and/or camera orientation (e.g. compensation of converging verticals), followed by the location-dependent resolution reduction to form one common warping/morphing step.

In a development of the present invention, the resolution reduction is also adjusted via the evaluation of camera parameters. Using camera parameters, it is possible to design the method such that an object is depicted in relation to the actual object size, independently of its position in the three-dimensional scene after the resolution reduction, using the same number of image points, or at least using more similar number of image points as compared to the prior art.

The camera parameters preferably include representation parameters, e.g. the focal length of the lens, the size of the sensor, etc. The camera parameters may also be designed as position parameters of the surveillance camera, i.e. they may describe its position and/or orientation. If the surveillance camera is a PTZ camera (pan-tilt-zoom camera), depending on the height and orientation of the surveillance camera, various data records that correspond to the possible PTZ settings are used, e.g., from a look-up table, to adjust the resolution reduction.

In a preferred development of the method, the processed input image is used for image analysis. In the image analysis, object segmentation and/or object tracking are/is carried out in particular, as is known from the prior art.

The information regarding the distortion that took place due to the location-dependent resolution reduction may also be used in the image analysis, and not only to rectify the object-describing metadata.

In the analysis of movement in particular, the change of shape of objects in the resolution-reduced image caused by the location-dependent resolution reduction when these objects move may be used by applying model assumptions of 3-dimensional position of these objects.

If the input image was subdivided into several overlapping sub-images, objects in particular that change from one sub-image to the next may therefore be better assigned to one another.

The object-describing metadata that are determined in the image analysis, e.g. rectangles that enclose objects and/or trajectories of objects, are rectified in a subsequent step in accordance with the resolution reduction according to the present invention, so that the object-describing metadata become a better geometric match for the input image(s). In a further, optional step, the object-describing metadata are stored.

A further subject matter of the present invention relates to a device for the resolution reduction of an input image. The device is preferably designed as a video surveillance system, in particular a real-time video surveillance system, wherein the evaluation of the video sequences that are recorded is carried out and/or may be carried out in real time.

The device according to the present invention includes an input module that is designed to receive an input image of a three-dimensional scene from a surveillance camera or a data memory, in particular a recorder. In the simplest manner, the input module may be designed as an interface that is connected to the data source in a cabled or wireless manner, in particular via the Internet.

A reduction module is designed as part of the device in such a manner that it carries out the resolution reduction of the input image with consideration for the object distance in the three-dimensional scene and/or the perspective distortion of the three-dimensional scene, in particular in the manner described above.

Preferably, a parameter module is implemented and is designed to provide parameters for reducing resolution, the parameters including information about the object distances in the three-dimensional scene and/or about the perspective distortion of the three-dimensional scene; as an option, the parameters may include supplemental camera parameters or they may be based thereon. The parameters may be entered by a user, or, as an alternative, the parameters may have been determined automatically via autocalibration in accordance with the prior art, e.g., by observing the three-dimensional scene for a long period of time.

Optionally, an analytical module is provided that is designed to carry out object detection and/or object tracking and/or video content analysis in the resolution-reduced input images in a manner known per se, and to generate object-describing metadata. The information about the distortion that occurred due to the resolution reduction may also be used in the analysis.

A compensation module, which is also optional, is designed to rectify the metadata so that they are adapted geometrically to the input image(s) again. Optionally, a memory medium is provided that stores the object-describing metadata after they are rectified.

A further subject matter of the present invention relates to a computer program having program code means for carrying out the method described above on a computer or the device that was described above.

The proposed invention ensures, in particular, that, in video surveillance systems that perform resolution reduction of the input images for reasons of computing time, an optimized pre-distortion of the images is carried out, instead of simply reducing the images equally in every dimension. The pre-distortion is dependent on the positioning and orientation of the surveillance camera relative to the scene being observed. Advantageously, resolution-reduced images are obtained that have a markedly improved detection rate in the subsequent image processing, in particular for remote objects.

Further advantages, features, and effects of the present invention result from the description that follows of a preferred embodiment of the present invention, and from the attached FIGURE.

BRIEF DESCRIPTION OF THE DRAWINGS

FIG. 1 shows a block diagram of a video surveillance system as an exemplary embodiment of the present invention.

DESCRIPTION OF THE PREFERRED EMBODIMENTS

FIG. 1 shows, based on a block diagram, a video surveillance system 1 which is connected via interfaces 2 to a plurality of surveillance cameras 3 and/or recorders or data sources 4. Video surveillance system 1 is used to automatically evaluate the video sequences recorded in surveillance camera 3 or the video sequences stored in data sources 4, in particular with regard for objects to be monitored and/or trajectories of objects to be monitored.

Video surveillance system 1 includes an input module 5 which is connected in a signal-transmitting manner to interfaces 2 in order to receive input images from surveillance cameras 3 and/or data sources 4, the input images being designed as parts of video sequences. The processing of a single input image 6 having resolution A will be discussed below as an example, input image 6 representing a street scene as an example of a three-dimensional scene.

Input image 6 is forwarded to a reduction module 7 which is designed to reduce resolution A of input image 6 to a lower resolution B (A>B), wherein the resolution is defined as the number of image points per area of the original image.

Parameter module 8 provides reduction module 7 with reduction parameters which control the resolution reduction of input image 6 as a function of the object distance of the street scene, i.e. the distance between surveillance camera 3 and the particular scene regions, or of the perspective distortion of a base plane of the street scene, and optionally the distortions that were caused by lens properties.

The reduction parameters are generated in advance in an off-line process, wherein various possibilities may be used:

In a first alternative, the reduction parameters are generated based on the assumption that there is a base plane in input image 6 on which the objects move, thereby making it possible to estimate a perspective distortion in input image 6 based on the assumed base plane. This perspective distortion is taken into account by the reduction parameters in a manner such that the resolution reduction of remote objects that appear smaller in input image 6 is less that that carried out for close objects that appear larger in input image 6.

In a second alternative, the reduction parameters are generated based on the assumption that there is a scene reference model in which different object distances or object distance ranges are assigned to the various image regions. In contrast to the use of the base plane, this second alternative results in the object distances being better taken into account, but the amount of computing effort required is higher. In the two alternatives that were described, self-calibration of the video surveillance system is also possible.

Optionally, sub-images that have been resolution-reduced and that may overlap with other object distance ranges are also determined for the various object distance ranges.

For the case in which surveillance camera 3 is designed as a PTZ camera (pan-tilt-zoom camera) or as another movable camera, when the reduction parameters are generated, the orientation and position of surveillance camera 3, e.g. the height and orientation of surveillance camera 3 above the base plane, is taken into account. For example, a look-up table is created for all possible PTZ settings, which may be accessed in order to obtain the reduction parameters. As an option and as a supplement, camera parameters, e.g. the focal length or optical representation characteristic values are taken into account in the generation of the reduction parameters.

The reduction parameters are transmitted to reduction module 7 which carries out, within the framework of an on-line calculation or a real-time calculation, a location-dependent resolution reduction of input image 6 according to the present invention based on the reduction parameters that were calculated in the off-line process, or, as an alternative, using reduction parameters that were obtained on-line and that result from the current pan-tilt-zoom setting of the PTZ camera, thereby generating intermediate image 9 which is resolution-reduced according to the present invention.

The resolution reduction may take place, in particular, in one overall step, or as a chain of several sub-steps, with further related intermediate images within reduction module 7.

In an image-processing module 10, an image analysis, in particular object detection and tracking, is carried out on intermediate image 9 or on subsequent images in the video sequence, wherein, in a manner known per se, object-describing metadata, e.g. enclosing rectangles or trajectories of objects, are formed. For purposes of illustration, the object-describing metafiles in FIG. 1 are depicted graphically between modules 10 and 11. In an actual realization of video surveillance system 1, these object-describing metadata will be transferred to downstream compensation module 11 only in the form of vectors or the like. Optionally, information about the distortion that took place due to the resolution reduction is sent from reduction module 7 to image-processing module 10, and it may be used to further improve detection performance.

In compensation module 11, the object-describing metadata are rectified in a manner such that they once again fit input image 6 geometrically, i.e. they may be placed over input image 6. These rectified, object-describing metafiles are visualized in FIG. 1 between module 11 and bulk memory 12. Finally, the rectified, object-describing metadata are stored in bulk memory 12, so that the data may be accessed at a later point in time. The necessary information about the distortion that took place is transmitted from reduction module 7 to compensation module 11 for this purpose.

FIG. 1 therefore shows video surveillance system 1 and the basic procedure for the down-sampling—which is dependent on camera position and orientation—of video sequences and input images for an optimized analysis via image processing.

It will be understood that each of the elements described above, or two or more together, may also find a useful application in other types of constructions and methods differing from the types described above.

While the invention has been illustrated and described as embodied in a method, device, and computer program for reducing the resolution of an input image, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A computer-implemented method for processing an input image recorded by a surveillance camera, in which the input image shows a three-dimensional scene in which a distance between the surveillance camera and objects in the three-dimensional scene is referred to as an object distance, and in which a resolution of the input image is reduced to realize a resolution-reduced image of the three-dimensional scene, the method comprising the steps of:
   in an off-line process, generating reduction parameters in advance that include information about perspective distortion of the three-dimensional scene; and
   using a computer, processing the input image and the off-line generated reduction parameters to implement a resolution reduction in the input image with consideration of the perspective distortion information of the three-dimensional scene; and
   wherein said resolution reduction in the resolution reduced image includes reducing resolution of regions in the input image that represent regions in the three-dimensional scene having great object distance to a lesser extent than that of regions in the input image that represent regions in the three-dimensional scene having a small object distance, thereby realizing the resolution-reduced image.

2. The method as defined in claim 1, further comprising adjusting the resolution reduction via an evaluation of camera parameters.

3. The method as defined in claim 1, further comprising adjusting the resolution reduction via modeling of a scene reference model and/or a base plane.

4. The method as defined in claim 1, further comprising combining the resolution reduction with other pre-rectifications of the input image.

5. The method as defined in claim 1, further comprising using a resulting distorted and resolution-reduced input image for image analysis.

6. The method as defined in claim 5, further comprising generating object-describing metadata by the image analysis.

7. The method as defined in claim 6, further comprising rectifying object-describing metadata in accordance with the resolution reduction that was carried out.

8. A computer program comprising program code means for carrying out the steps of the method as defined in claim 1 when the program is run on a computer.

9. The method as defined by claim 1, further comprising a step of providing access to the input image with the adjusted resolution reduction.

10. The computer-implemented method according to claim 1, further including using a camera parameter in the reduction parameter.

11. The computer-implemented method according to claim 1, further including using a predefined resolution reduction to image regions to which an actual object distance is unassignable.

12. A video surveillance system for reducing resolution of an input image of a three-dimensional scene to realize a resolution reduced image, comprising
- an input module configured to receive the input image from a surveillance camera, a recorder or both;
- a parameter module for providing resolution reduction parameters that include information about perspective distortion of the three-dimensional scene; and
- a reduction module configured to receive the reduction parameters, to reduce a resolution of the input image with consideration for an object distance in the three-dimensional scene, the perspective distortion of the three-dimensional scene or both;
- wherein the reduction module reduces resolution of regions in the input image that represent regions in the three-dimensional scene having great object distance to a lesser extent than that of regions in the input image that represent regions in the three-dimensional scene having a small object distance, on a basis of the reduction parameters, thereby realizing the resolution-reduced image.

13. The video surveillance system as defined in claim 12, further comprising a parameter module which is configured to provide parameters for the resolution reduction, the parameters including or being based on information about the object distances in the three-dimensional scene and/or about the perspective distortion of the three-dimensional scene.

14. A computer program comprising program code means for carrying out the steps of the method as recited in claim 1 when the program is run on the video surveillance system of claim 12.

15. The video surveillance system of claim 12, further comprising an image processing module configured to process the reduced resolution input image to detect, segment or track objects therein.

16. A computer-implemented method for processing an input image recorded by a surveillance camera, in which the input image shows a three-dimensional scene in which a distance between the surveillance camera and objects in the three-dimensional scene is referred to as an object distance, and in which a resolution of the input image is reduced to realize a resolution-reduced image of the three-dimensional scene, the method comprising the steps of:
- in an off-line process, generating reduction parameters in advance that comprise information about perspective distortion of the three-dimensional scene; and
- using a computer, processing the input image and the off-line generated reduction parameters comprising the perspective distortion information to adjust a resolution reduction in the input image via modeling of a scene reference model and with consideration of a perspective distortion information of the three-dimensional scene;
- wherein said resolution reduction includes reducing resolution of regions in the input image that represent regions in the three-dimensional scene having great object distance to a lesser extent than that of regions in the input image that represent regions in the three-dimensional scene having a small object distance thereby realizing the resolution reduced image.

* * * * *